Aug. 18, 1964    H. G. LEUPOLD    3,144,771
INDICATING AND RECORDING CONTROL
Filed April 4, 1960    4 Sheets-Sheet 1

INVENTOR.
Henry G. Leupold
BY
ATT'YS

Aug. 18, 1964
H. G. LEUPOLD
3,144,771
INDICATING AND RECORDING CONTROL
Filed April 4, 1960
4 Sheets-Sheet 2
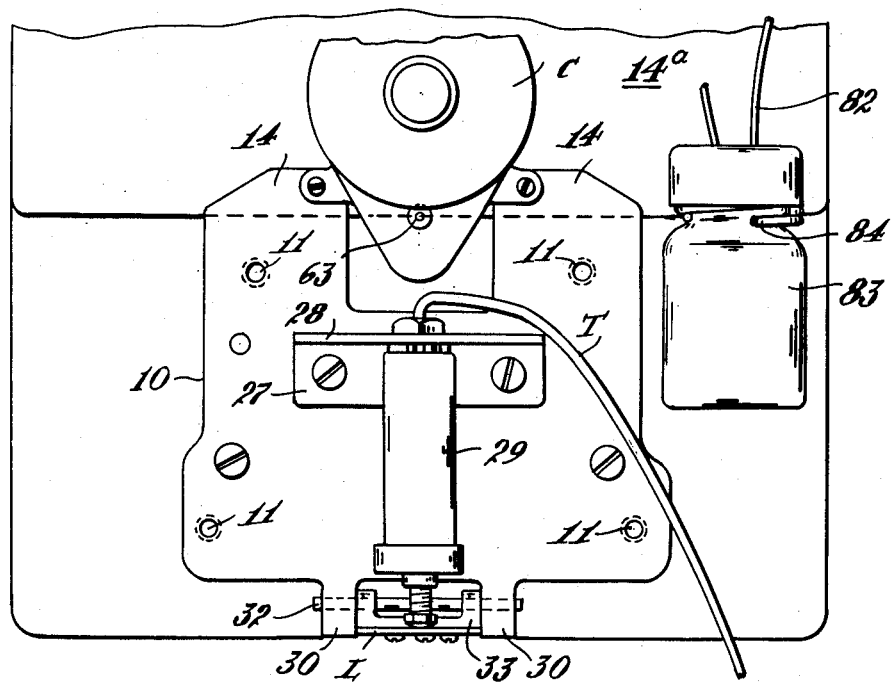
Fig. 2
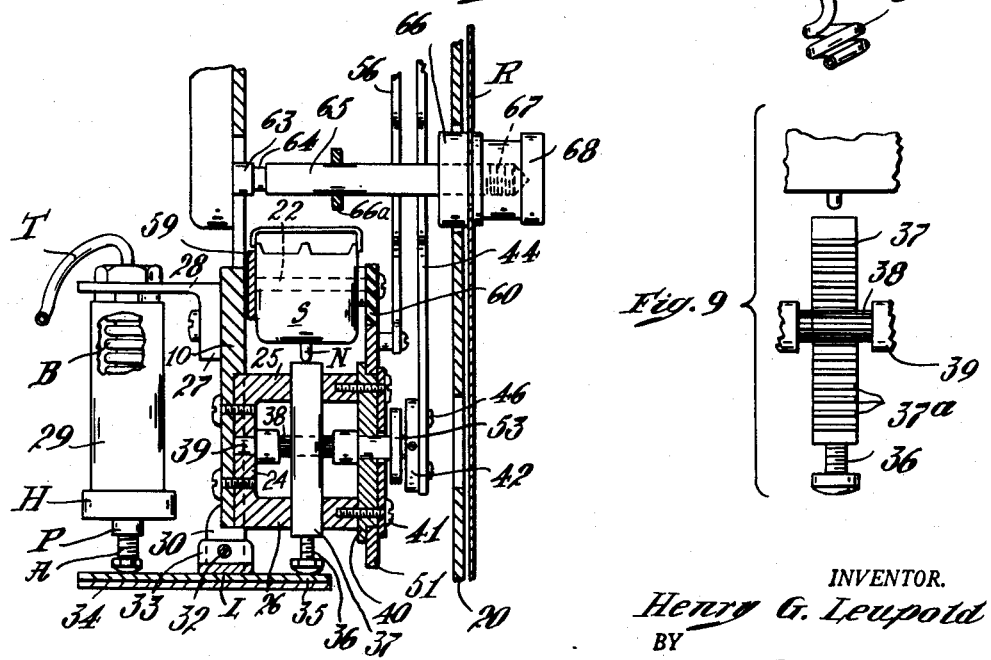
Fig. 4
Fig. 9
INVENTOR.
Henry G. Leupold
BY
Roberts Cushman & Grover
ATT'YS Aug. 18, 1964  H. G. LEUPOLD  3,144,771
INDICATING AND RECORDING CONTROL
Filed April 4, 1960  4 Sheets-Sheet 3

INVENTOR.
Henry G. Leupold
BY
ATT'YS

Aug. 18, 1964  H. G. LEUPOLD  3,144,771
INDICATING AND RECORDING CONTROL
Filed April 4, 1960  4 Sheets-Sheet 4

INVENTOR.
Henry G. Leupold
BY
Roberts Cushman & Grover
ATT'YS

United States Patent Office 3,144,771
Patented Aug. 18, 1964

3,144,771
INDICATING AND RECORDING CONTROL
Henry G. Leupold, Arlington, Mass., assignor to United Electric Controls Company, Watertown, Mass., a corporation of Massachusetts
Filed Apr. 4, 1960, Ser. No. 19,714
8 Claims. (Cl. 73—368)

This invention pertains to indicating and/or recording controls, herein illustrated by way of example as of the remote reading type and such are employed for automatically controlling apparatus, for instance ovens, incubators, test chambers, dough conditioners, etc.; and, in general, gas, liquid or metal temperatures, in response to temperature or fluid pressure variations, and with provision for indicating the instant temperature, fluid pressure, or the like, and including means for setting the control to respond to different conditions within a predetermined range. Herein for purposes of illustration, but without limitation, the instrument is shown and will be described with reference to its embodiment in a thermostat for use in controlling apparatus remote from the instrument itself.

Instruments of this kind commonly employ a pressure motor for actuating the movable parts. The motor most commonly used for this purpose comprises a metallic bellows which is connected by a capillary tube to a bulb or the equivalent, externally exposed to the temperature variations in an ambient medium at the apparatus to be controlled, the bulb, tube and bellows being filled with a fluid, usually a liquid having a high coefficient of thermal expansion.

The instrument of the present invention comprises a pointer which moves over a graduated scale in response to temperature change; a clock-driven record disk with which cooperates a pen whose position, radially of the disk, varies in response to such temperature changes, a precision switch of the snap-action type, and adjusting means, cooperable with the graduated dial, for determining the temperature at which the switch will be actuated.

One object of the invention is to provide a novel instrument of the above type which is simple and inexpensive in construction and which is convenient to adjust in service.

A further object is to provide an instrument of the above type so devised that when the instrument itself is located at a substantial distance from the place or apparatus where temperature is to be indicated and/or recorded, fluctuations in the temperature of the medium immediately surrounding the instrument will be compensated for automatically.

A further object is to provide an instrument of the above kind wherein the pointer, pen and switch are actuated by a motor of the bellows type which responds to fluid pressure fluctuations, such as those produced by expansion or contraction of a liquid exposed to temperature variations.

A further object is to provide an instrument of the above type wherein the actuating pin of a snap-action switch is operable by that motor actuated part which also actuates the indicating pointer and the recording pen.

A further object is to provide an instrument of the above kind having provision for adjusting the initial distance between the actuating pin of the switch and the part which moves it, thereby to determine the temperature at which the switch shall be actuated.

Other and further objects and advantages of the invention will be pointed out in the following more detailed description and by reference to the accompanying drawings, wherein—

FIG. 2 is a fragmentary rear elevation of the parts shown in FIG. 1, but with the upper portion of the device broken away;

FIG. 4 is a fragmentary vertical section substantially on the line 4—4 of FIG. 1, omitting the upper part of the device;

FIG. 9 is a fragmentary rear elevation, showing a portion of the switch and the means for actuating it, omitting other parts;

Figure 5:
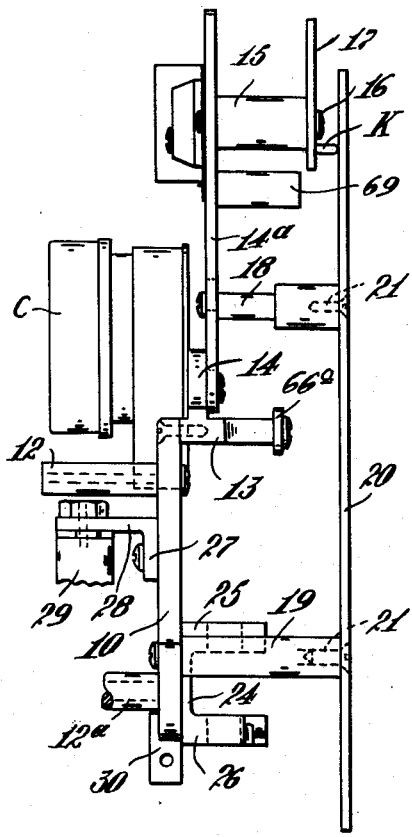
FIG. 5 is a right-hand side elevation of the chassis of the instrument, omitting the moving parts.
Figure 6:
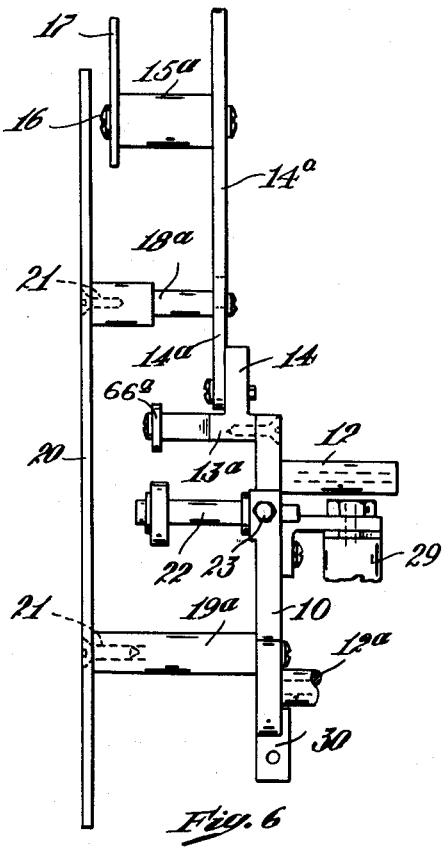
FIG. 6 is a similar view of the left-hand side of the chassis.

Referring to the drawings, and in particular to FIGS. 4, 5 and 6, the instrument in a preferred form comprises a chassis which includes a rear plate 10, for example of sheet brass or the like, and of sufficient thickness, for instance approximately ⅛ of an inch, to provide the requisite rigidity. This plate is provided, as shown in FIG. 2, with four screw-threaded openings 11, each designed to receive the screw-threaded end of a rigid post, such as the posts 12 and 12a (FIGS. 5 and 6), which extend rearwardly, and each of which is provided with a screw-threaded bore at its rear end for the reception of a screw, whereby the chassis of the instrument may be secured within a suitable housing or case, or attached to a wall panel or the like.

To the upper part of the plate 10, two brackets 13 and 13a are secured, for example by welding, or, if preferred, by screws 13b, each of these brackets having an upstanding arm 14, to which the lower portion of a plate 14a is secured as, for example, by screws passing through the plate and into the arms 14—14. This plate 14a may, for example, be of sheet brass and, while rigid, need not be as thick as the plate 10. This plate 14a is provided at its upper portion with spaced openings for the reception of screws, by means of which the forwardly extending posts 15 and 15a are secured to the plate 14a. These posts 15 and 15a are provided with screw-threaded bores at their forward ends for the reception of screws 16, by means of which a dial plate 17 is secured in spaced relation to the plate 14a. This dial plate 17 is provided (FIG. 1) at its front face with a graduated scale D, which may be formed upon the surface of the plate 17 itself, or which may be carried by a separate dial member, for example of paper or plastic, which is attached to the plate 17 by the screw 16. The graduated scale is arcuate, with its center of curvature at the axis about which the index or pointer, hereafter described, swings.

Spaced downwardly from the posts 15 and 15a there are two other posts 18 and 18a connected by screws to the plate 14a, and having screw-threaded bores at their forward ends. Another pair of forwardly extending posts 19 and 19a are secured to the lower part of the base plate 10, these posts also having screw-threaded bores at their forward ends. The post 18 and 18a and the posts 19 and 19a have their forward ends in the same vertical plane and constitute a support for the face plate 20, which is secured to the several posts by screws 21.

Near the right-hand side of the base plate 10 (FIG. 6), at a point between the bracket 13a and the post 19a, the plate 10 has an opening for the reception of the rear end of a fixed shaft 22, which is secured in position in the plate 10 by a screw or bolt 23 having threaded engagement with an opening in the edge of the plate 10, this shaft constituting a support defining an axis about which the switch, hereafter described, may rock.

A U-shaped bracket 24 (FIG. 5), comprising the parallel horizontal arms 25 and 26, is secured by screws to the lower part of the base plate 10 at the center of the latter, while another bracket 27, having a horizontal arm 28, is secured to the rear side of the plate 10 at approximately the middle of the latter and at a point just below the level of the post 12, 12a. The horizontal arm 28 of this bracket constitutes a support for the pressure motor 29. This pressure motor may be of any appropriate type but is desirably of the kind illustrated and described in the patent to Leupold No. 2,797,272, including a casing within which there is arranged a metallic bellows B (FIG. 4), having a fixed head at its upper end provided with an opening for the admission of pressure fluid supplied by the capillary tube T, which may be of any desired length and whose opposite end communicates with a sensing device for example a bulb or coil C$^\times$ (FIG. 2), containing temperature responsive fluid, and which is exposed to the temperature of the medium which is to be controlled or regulated. The lower movable head of the bellows (not here shown) has connected thereto the upper end of a rod P which moves up and down in a guide opening in the lower head or closure cap H of the motor device, this rod having a screw-threaded axial bore at its lower end which receives the motion-transmitting element A. This motion-transmitting element is here shown as a screw having a downwardly convex head.

Figure 7:
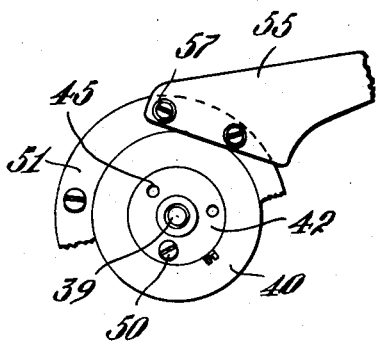
FIG. 7 is a fragmentary front elevation showing the means for adjusting the position of the switch and the support upon which the index is mounted.
Figure 8:
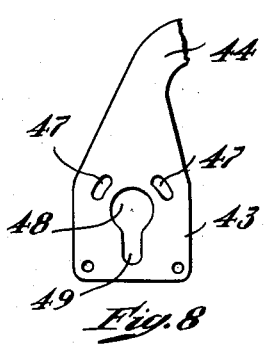
FIG. 8 is a fragmentary front elevation showing the base or lower portion of the index or pointer.

Two brackets 30 (FIGS. 1, 5 and 6) are welded to the lower edge portion of the plate 10, these brackets extending downwardly below the edge of the plate 10 and being provided with aligned openings for the reception of a fixed shaft 32 (FIGS. 1 and 2), on which is mounted, to rock, a part 33 which is welded or soldered to the central part of a lever L (FIG. 2), comprising the rear arm 34 (FIG. 4) and the forward arm 35. The rear arm 34 is directly below the motion-transmitting element A and in contact with the latter. The forward arm 35 of the lever is directly below and normally in contact with the downwardly convex head of a screw 36 having threaded engagement with a threaded axial bore in a vertically slidable rod 37. This rod 37 (FIG. 4) is guided to move up and down in suitably shaped, aligned openings in the arms 25 and 26 of the bracket 24. At its right-hand side, this rod 37 is provided with rack teeth 37a (FIG. 9), which engage the teeth of a pinion 38 fixed to or formed upon a shaft 39, the rear end of which turns in a bearing in the bracket 24, and the forward end of which turns in a bearing in a plate 40 secured by screws 41 to the forward edges of the arms 25 and 26 of the bracket 24. To the forward end of this shaft 39 and at a point intermediate the plate 40 and the face plate 20, there is secured a disk 42. This disk, as shown in FIG. 7, is provided with spaced screw-threaded holes 45 for the reception of screws 46 (FIG. 4) which pass through arcuate slots 47 (FIG. 8), respectively, in the base portion 43 of the index or pointer 44, which cooperates with the graduated scale D. This base portion is also provided with a keyhole slot whose upper part 48 receives the forward end of the shaft 39 and whose lower portion 49 receives the head of an eccentric screw 50 having screw-threaded engagement with a threaded hole in the disk 42. By this arrangement it is possible, by first loosening the screws 46, and then by turning the eccentric screw 50, to adjust the index or pointer relatively to the disk 42, the screws 46 then being tightened to retain the parts in adjusted position.

The plate 40 has a circular bearing portion upon which a ring 51 is mounted for rotation. The peripheral edge of this cam ring is eccentric with respect to the axis of the shaft 39.

A pin 52 (FIG. 1) projects forwardly from the ring 51 and forms the anchorage for the outer end of a clock spring 53, whose inner end is secured to the shaft 39, this spring being so arranged as to tend to turn the shaft 39 and thereby the index 44 in a counterclockwise direction so as to move the tip of the index to the left until it is stopped by contact with a pin K projecting forwardly from the dial plate D.

In order to turn the eccentric ring 51 relatively to the disk 42, a part 55 (FIG. 7) is secured to the ring by screws 57, this part 55 being the lower end or base of an adjusting arm 56 (FIG. 1) which extends upwardly to the rear of the dial plate D and has its upper end bent over the upper edge of the dial plate, so as to provide a pointer 58 at the front of the dial plate and which may be moved along the graduated scale.

A supporting frame, comprising spaced parallel arms 59 and 60, is mounted to swing on the stationary shaft 22 (FIG. 4). A switch S of the snap-action type is fixed in this frame between the arms 59 and 60, the parts being so disposed that the operating pin N (FIG. 4) of the switch is directed downwardly and in coaxial relation to the vertically slidable rod 37. A spring 61 (FIG. 1), connected at its upper end to the frame member 59 and at its lower end to a fixed pin 62 projecting from the plate 10, urges the switch supporting frame downwardly, that is, in a counterclockwise direction as viewed in FIG. 1. The arm 60 of the switch supporting frame, which is preferably of an insulating material, for example hard rubber, is so located that its lower edge contacts the upper part of the eccentric ring 51. Thus, by turning the eccentric ring, the normal position of the lower end of the switch pin N may be varied.

Figure 10:
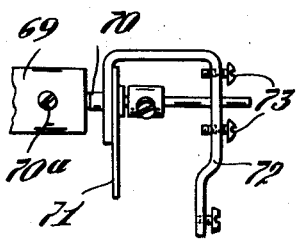
FIG. 10 is a fragmentary side elevation on the left-hand side of the device showing the means for supporting and actuating the recording pen.

A forwardly directed post 69 (FIGS. 5 and 10) is secured at its rear end to the upper part of the plate 14a, this post having an axial bore which receives the rear end portion of a fixed horizontal shaft 70 which is secured to the post 69 by a set screw 70a. A U-shaped frame comprising the substantially parallel arms 71 and 72 is mounted to swing on this shaft 70. The forward arm 72 of this frame is provided with screw-threaded openings, one above and one below the shaft 70, which receive screws 73, passing loosely through holes in the pen arm 75 (FIG. 1), by means of which the central resiliently flexible portion 74 of the pen arm 75 is attached to the frame. The pen arm is of thin resiliently flexible material, but its upper portion is stiff, because of rearwardly directed marginal flanges. However, its central panel 74 is isolated from its marginal portions by an inverted U-shaped slot. By applying rearward pressure to the upper end of the pen arm the latter will be rocked about an axis passing through the lower ends of the slot, thus raising the stylus from operative position to faciliate removal or replacement of the record disk. The arm 72 has another screw-threaded opening at its lower end which receives an eccentric screw 76 which passes through an elongate slot 77 in the pen arm, this arrangement being such that the pen arm may be adjusted angularly with reference to the actuating arm 72.

The U-shaped frame has a third arm 78 (FIG. 1), which is connected by a rod 79 to a part 80, integral with the base 43 of the index arm 44, so that as the index arm swings, the pen arm 74 likewise swings. A stylus 81 is mounted on the lower part of the pen arm, and a suitable marking fluid is supplied to this stylus by a capillary tube 82 of flexible character, which extends rearwardly through an opening in the dial plate D, and through another opening in the plate 14a, and then downwardly (FIG. 2) into a suitable reservoir 83 which is detachably secured to the plate 14a by a spring clip 84.

Figure 1:
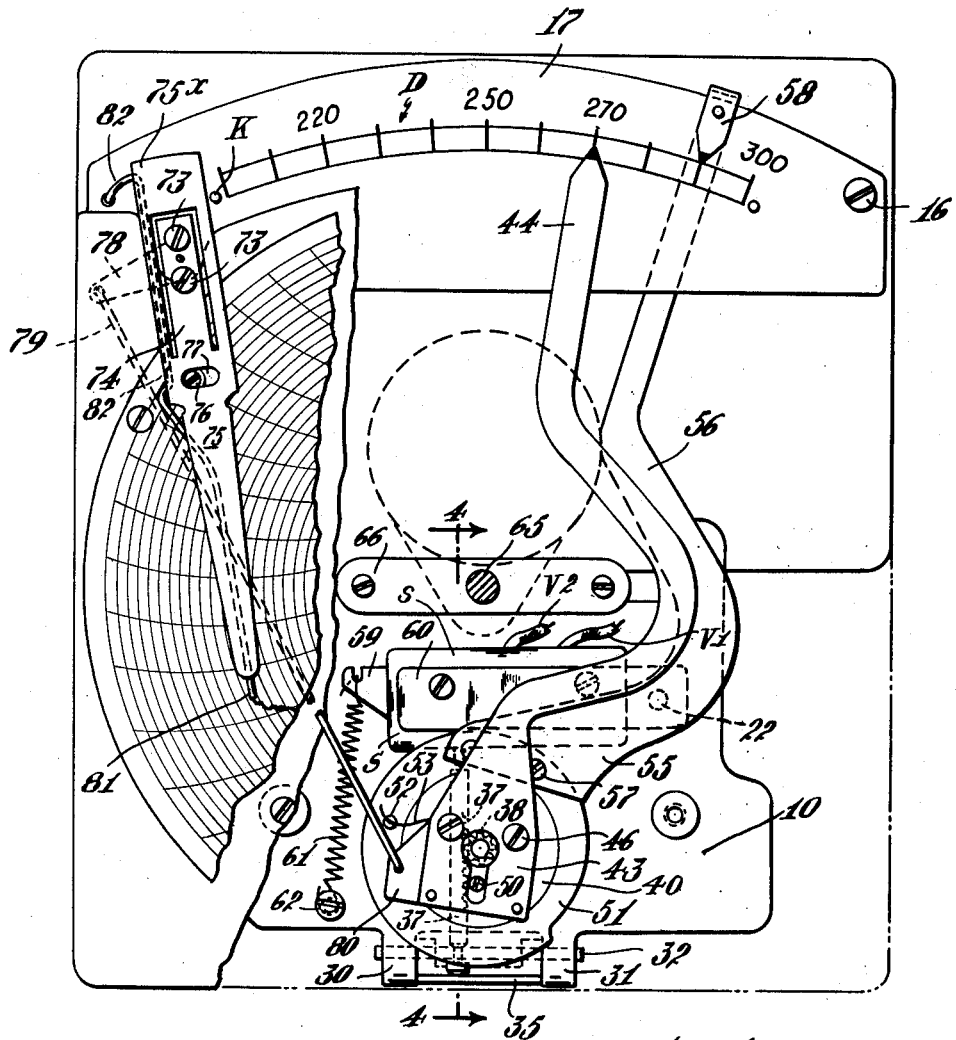
FIG. 1 is a front elevation of the instrument of the present invention, certain parts being broken away and the enclosing casing being omitted.

A synchronous-motor clock device C is arranged at the back of the plate 14a and is attached by screws to the arms 14—14 of the brackets 13, 13a. This motor is supplied with current through conductors $W^1$ and $W^2$ which lead to terminals in a bus bar U mounted on the back of the plate 14a. The output shaft 63 (FIG. 4) of the clock motor extends forwardly between the upstanding arms 14—14 (FIG. 2) of the brackets 13, 13a and is provided with an axial socket which receives the polygonal end 64 of a shaft 65 which extends forwardly through a bearing opening in a plate 66a attached to the forward ends of the bracket members or posts 13 and 13a. The shaft 65 extends further forward and is provided with a disk 66 located in an opening in the face plate 20, this disk forming an abutment for the central portion of a recording sheet R of the kind commonly employed in temperature recorders. Forwardly of the disk 66 the shaft 65 is provided with a screw-threaded portion 67 which receives a clamping nut 68, by means of which the recording sheet may be clamped firmly against the disk 66. As shown in FIG. 1 of the drawings, the arms 44 and 56 are so shaped as to permit full swing of the index element and the part 58 without interference with the clamping nut 68.

Assuming that the apparatus has been adjusted for a given temperature by the movement of the part 58 along the graduated scale, thus determining the initial distance between the switch actuating pin N and the upper end of the vertically movable rod 37, a rise in temperature in the ambient medium surrounding the bulb $C^x$ will result in a downward motion of the rod P, and thus a rocking of the lever arm 34 downwardly with a corresponding motion of the arm 35 upwardly. This motion of the arm 35 moves the rod 37 up and, by means of the rack teeth on this rod, turns the shaft 39 and thus swings the index arm 44 so that the index element travels along the scale. If the temperature continues to rise until the index element coincides with the member 58, the switch pin N will be elevated sufficiently to actuate the switch and thus, it may be understood through suitable circuit connections (not shown), will reduce the source of heat so that the medium surrounding the bulb $C^x$ will then remain at the same temperature or become cooler. In the latter case, the indicator element will move backwardly down the scale and eventually the switch pin will be permitted to move downwardly, thus closing the switch contacts and again energizing the source of heat.

It is manifest that adjustments with reference to the temperature at which the switch shall be actuated may be made merely by swinging the arm 56 to carry the member 58 along the scale to the desired point for switch actuation. Furthermore, for initially adjusting the relation between the switch and the actuating lever arm 35, the screw 36 may be turned. The indicator element may be nicely adjusted with reference to the operation of the pressure motor by turning the eccentric screw 50 and, as above noted, the pen arm may be adjusted relatively to the indicator arm by turning the screw 76.

Figure 11:
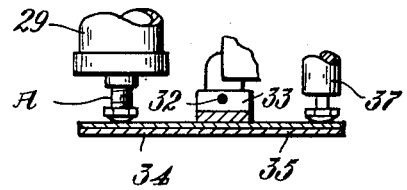
FIG. 11 is a fragmentary vertical section to larger scale than FIG. 1, showing a bi-metallic temperature-compensating device forming an element of the instrument.
Figure 12:
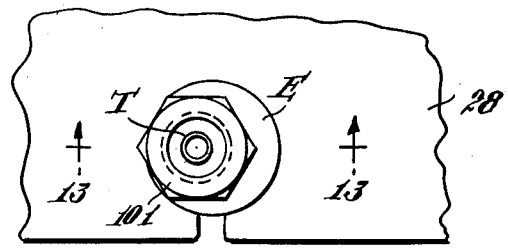
FIG. 12 is a fragmentary plan view of the bracket which supports the fluid pressure motor, showing the means whereby the motor may be adjusted bodily in a horizontal direction.
Figure 13:
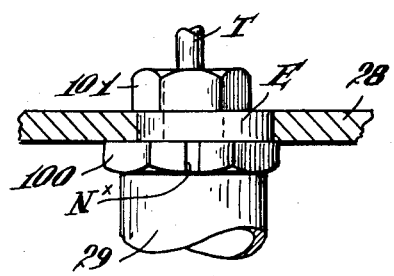
FIG. 13 is a fragmentary section on the line 13—13 of FIG. 12.

As more clearly illustrated in FIG. 11, the lever L which comprises the arms 34 and 35 is of bi-metal construction, comprising upper and lower layers having different coefficients of temperature expansion. Thus as the ambient temperature varies, the ends of the lever will curl upwardly or downwardly, thereby to compensate for the effect of change in the temperature of the air surrounding the bellows B. To provide for adjustment of the leverage with which the part A (FIG. 4) acts upon the lever arm 34, the cylinder 29 of the motor device is mounted as more fully illustrated in FIGS. 12 and 13. The cylinder has an upwardly extending stud $N^x$ comprising an eccentric disk portion E arranged to be turned in a circular opening in the bracket member 28. Above and below the disk, the stud is screw-threaded and a split nut 100 engages the stud below the member 28, and a nut 101 engages the stud above the nut 28, thereby providing for clamping the motor in adjusted position. By loosening the nut 101, the cylinder may be turned and, because of the eccentric disk, the axis of the part A will be moved toward or from the fulcrum of the lever 34, 35.

The apparatus thus provided is simple in construction and rugged and durable so that it is not injuriously affected if subjected to rapid and prolonged vibration. The material and parts employed in its manufacture are relatively cheap, and in many instances standard parts which may be purchased on the general market. By the use of a single apparatus temperatures are indicated to the observer, a permanent record of temperature variations over a period of, for example, twenty-four hours, may be made, and a control switch for determining the operation of a heating system or the like, are all controlled by the same pressure motor 29 in response to temperature variations.

Figure 3:
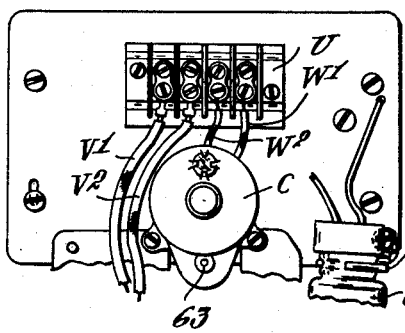
FIG. 3 is a fragmentary rear elevation, to smaller scale, showing the upper portion of the instrument.

As shown in FIGS. 1 and 3, flexible conductors $V^1$ and $V^2$ lead from the terminal of switch S to the bus bar U.

While one desirable embodiment of the invention has been herein disclosed by way of example, it is to be understood that the invention is broadly inclusive of any and all modifications and equivalent constructions which fall within the scope of the appended claims.

I claim:

1. An apparatus of the kind wherein an index element moves in an arcuate path along a graduated scale, and wherein a pressure motor has a movable element which moves in accordance with temperature variations, and has means for transmitting motion from said movable element to the index element, said apparatus comprising, in combination, a snap-action switch having an operating pin, a movable member which, by contact with the pin, actuates the switch, an eccentric coaxial with the index element operative to determine the normal distance between said pin and the movable member, and means including a part which moves in an arcuate path along said scale for turning the eccentric.

2. Apparatus according to claim 1, wherein the switch is bodily movable thereby to vary the normal distance between its operating pin and said movable member, and means for transmitting motion from the eccentric to the switch.

3. Apparatus according to claim 1, comprising a pivoted frame so supporting the switch that the latter may be swung to vary the normal distance between its operating pin and said movable member, and wherein a part of said frame rests upon the eccentric, and comprising a spring arranged to urge said frame in a direction to decrease the normal distance between the switch pin and said movable member.

4. In apparatus of the class described, wherein a drive shaft for a record disk is driven at uniform speed by a clock mechanism, and wherein a pen arm supports a stylus, for making a record on the disk, in combination, a dial plate provided with an arcuate graduated scale, said scale being located radially outwardly beyond the edge of the disk, an index element movable along said scale, said index element being carried by an arm which swings about an axis located at the opposite side of the axis of the disk from the scale, said arm being so shaped as to permit full swing of the index element along the scale without interference from the disk shaft, means for transmitting motion from the index arm to the pen arm, a pressure motor responsive to temperature changes for swinging said index arm, a snap-action switch having an operating pin, and means for moving said operating pin thereby to actuate the switch when the index element reaches a predetermined point along the scale.

5. Apparatus according to claim 4, wherein the means for moving the switch pin for actuating the switch comprises a movable rod coaxial with the pin, means movably supporting the switch whereby the normal distance between the switch operating pin and said rod may be varied, and an oscillatable part coaxial with the index arm for shifting the switch.

6. Apparatus according to claim 4, wherein the pressure motor comprises a movable part, means for transmitting motion from said part to said movable rod, the latter being provided with rack teeth, and a shaft on which the index arm is mounted and which has a pinion meshing with said rack teeth.

7. Apparatus according to claim 4, including an index shaft on which the index arm is secured, said index shaft having a pinion thereon, a rack bar having teeth which mesh with the pinion, a pressure motor for moving said rack bar thereby to swing the index arm, a fixed disk coaxial with said index shaft, a ring concentric with said disk, the disk providing a bearing on which the ring can revolve, said ring being of varying radial thickness whereby its outer edge constitutes a cam, a bodily movable snap-action switch having an actuating pin coaxial with said rack bar, a frame on which the switch is mounted, said frame comprising a part engageable with said cam, spring means holding said part in contact with the cam, and means for turning the cam ring relatively to the fixed disk.

8. An apparatus of the kind wherein an index element is movable by motion transmission means in an arcuate path along a graduated scale, and wherein a pressure motor has a movable element which moves in accordance with temperature variations; comprising a pivotally supported bimetallic lever operably associated with the movable element and the index element so as to transmit motion of the movable element to the index element, the ends of said lever, respectively, having contact with the movable element and the motion-transmission means, said motor comprising a cylinder having a stud projecting from one end, a disc fixed to said stud, the disc being eccentric with respect to the axis of the cylinder and being arranged to turn in a hole in a fixed part of the instrument frame, and means whereby the disc may be clamped in adjusted position, the rotation of the disc resulting in bodily motion of the motor cylinder in a direction perpendicular to its axis, thereby to shift the point of contact of the movable element toward or from the axis of pivotal support of the lever.

References Cited in the file of this patent
UNITED STATES PATENTS

| | | |
|---|---|---|
| 1,313,333 | Roesch | Apr. 7, 1917 |
| 1,633,380 | Irwin | June 21, 1927 |
| 2,359,141 | Moore | Sept. 26, 1944 |
| 2,562,385 | Marcellus | Jan. 15, 1949 |
| 2,549,011 | Robins | Apr. 17, 1951 |
| 2,593,351 | Shannon | Apr. 15, 1952 |
| 2,677,589 | Johnsen | May 4, 1954 |
| 2,797,272 | Leupold | Aug. 23, 1954 |
| 2,911,278 | Haigler | Nov. 3, 1959 |

FOREIGN PATENTS

| | | |
|---|---|---|
| 1,017,857 | France | Oct. 1, 1952 |